United States Patent
Beale et al.

(10) Patent No.: US 11,283,560 B2
(45) Date of Patent: Mar. 22, 2022

(54) METHODS, COMMUNICATIONS DEVICE AND INFRASTRUCTURE EQUIPMENT

(71) Applicants: Sony Corporation, Tokyo (JP); Sony Mobile Communications Inc., Tokyo (JP)

(72) Inventors: Martin Warwick Beale, Basingstoke (GB); Shin Horng Wong, Basingstoke (GB); Basuki Priyanto, Lund (SE)

(73) Assignees: SONY CORPORATION, Tokyo (JP); SONY MOBILE COMMUNICATIONS, INC., Tokyo (JP)

( * ) Notice: Subject to any disclaimer, the term of this patent is extended or adjusted under 35 U.S.C. 154(b) by 36 days.

(21) Appl. No.: 16/969,982

(22) PCT Filed: Feb. 11, 2019

(86) PCT No.: PCT/EP2019/053334
§ 371 (c)(1),
(2) Date: Aug. 14, 2020

(87) PCT Pub. No.: WO2019/158484
PCT Pub. Date: Aug. 22, 2019

(65) Prior Publication Data
US 2021/0152298 A1    May 20, 2021

(30) Foreign Application Priority Data
Feb. 16, 2018 (EP) ..................... 18157261

(51) Int. Cl.
*H04L 5/00* (2006.01)
*H04L 1/08* (2006.01)
*H04L 1/18* (2006.01)

(52) U.S. Cl.
CPC ............... *H04L 5/001* (2013.01); *H04L 1/08* (2013.01); *H04L 1/1835* (2013.01); *H04L 1/1896* (2013.01)

(58) Field of Classification Search
CPC ......... H04L 5/001; H04L 1/08; H04L 1/1835; H04L 1/1896; H04L 1/005;
(Continued)

(56) References Cited

U.S. PATENT DOCUMENTS

2015/0382362 A1* 12/2015 Park .................. H04W 72/082
370/330

OTHER PUBLICATIONS

Interdigital Inc., "Code Block based HARQ for NR," 3GPP TSG RAN WG1 Meeting No. 89, R1-1709013, Hangzhou, P.R. China, May 15-19, 2017, pp. 1-4 (Year: 2017).*

(Continued)

*Primary Examiner* — Hardikkumar D Patel
(74) *Attorney, Agent, or Firm* — Xsensus LLP

(57) ABSTRACT

A method of receiving data at a communications device from an infrastructure equipment forming part of a radio network part of a wireless communications network is provided. The method comprises receiving at the communications device one or more downlink transport blocks, estimating the data carried by each of the one or more downlink transport blocks by performing an error correction decoding in accordance with the error correction encoding applied by the infrastructure equipment.

10 Claims, 7 Drawing Sheets

(58) Field of Classification Search
CPC .............. H04L 25/0246; H04L 25/0321; H04L 25/03318; H04L 25/067; H04L 1/0002; H04L 1/0045; H04L 2025/03426; H04L 1/0067; H04L 1/1812; H04L 1/1819; H03M 13/2966; H03M 13/6306; H03M 13/15; H03M 13/1515; H03M 13/2732; H03M 13/2957; H03M 13/2972; H04N 19/436; H04N 19/61; H04B 7/0854; H04B 7/0857

See application file for complete search history.

(56) References Cited

OTHER PUBLICATIONS

International Search Report and Written Opinion dated May 7, 2019 for PCT/EP2019/053334 filed on Feb. 11, 2019, 12 pages.
Ericsson and Qualcomm, "New WID on Even further enhanced MTC for LTE," 3GPP TSG RAN Meeting No. 75, RP-170732, (revision of RP-170465), Dubrovnik, Croatia, Mar. 6-9, 2017, 4 pages.
Ericsson, "Revised WID for Further Enhanced MTC for LTE," 3GPP TSG RAN Meeting No. 73, RP-161464, revision of RP-161321, New Orleans, USA, Sep. 19-22, 2016, 6 pages.
Holma, H. and Toskala, A., "System Architecture Based on 3GPP SAE," LTE for UMTS—OFDMA and SC-FDMA Based Radio Access, John Wiley & Sons, Ltd., 2009, pp. 25-27.
Huawei and Hisilicon, "Revised work item proposal: Enhancements of NB-IoT," 3GPP TSG RAN Meeting No. 73, RP-161901, revision of RP-161324, New Orleans, USA, Sep. 19-22, 2016, 7 pages.
Huawei, et al., "New WID on Further NB-IoT enhancements," 3GPP TSG RAN Meeting No. 75, RP-170852, Dubrovnik, Croatia, Mar. 6-9, 2017, 6 pages.
Interdigital Inc., "Code Block based HARQ for NR," 3GPP TSG RAN WG1 Meeting No. 89, R1-1709013, Hangzhou, P.R. China, May 15-19, 2017, pp. 1-4.
NTT Docomo, Inc., "Processing time and HARQ process Number for NR," 3GPP TSG RAN WG1 AH_NR Meeting, R1-1700624, Spokane, USA, Jan. 16-20, 2017, pp. 1-7.
Orange, "On the interest of more flexible resource allocation for efeMTC," 3GPP TSG-RAN WG1 Meeting No. 91, R1-1720541, Reno, Nevada, USA, Nov. 27-Dec. 1, 2017, pp. 1-4.

* cited by examiner

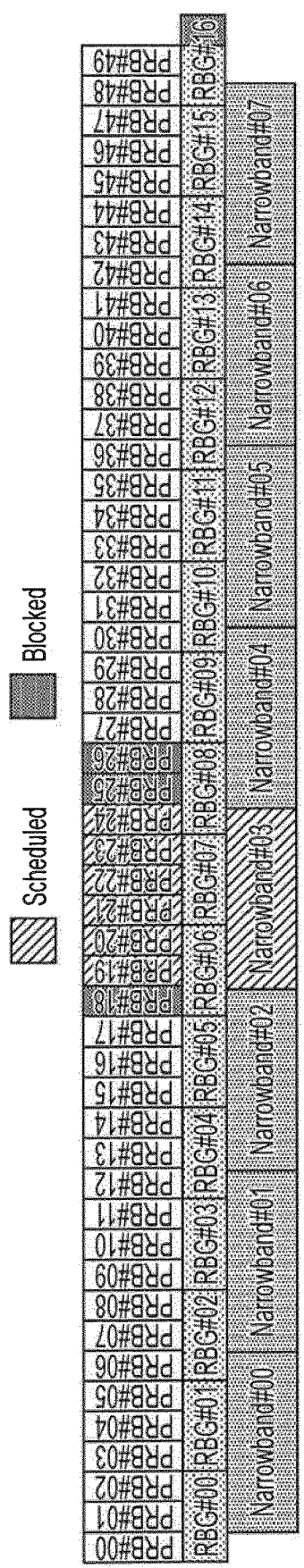
FIG. 5
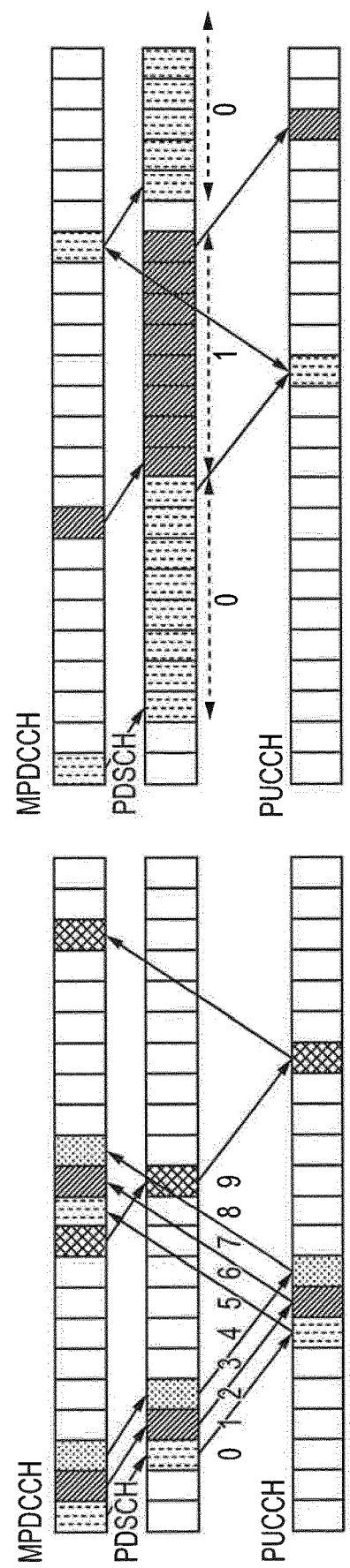
FIG. 6
FIG. 7

METHODS, COMMUNICATIONS DEVICE AND INFRASTRUCTURE EQUIPMENT

CROSS-REFERENCE TO RELATED APPLICATIONS

The present application is based on PCT filing PCT/EP2019/053334, filed Feb. 11, 2019, which claims priority to EP 18157261.1, filed Feb. 16, 2018, the entire contents of each are incorporated herein by reference.

BACKGROUND

Field of Disclosure

The present disclosure relates to infrastructure equipment and communications devices of wireless communications systems. Embodiments of the present technique can find application with Automatic Repeat Request (ARQ)-type protocols, such as, for example Hybrid ARQ.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using an LIE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data, and as such may be configured to operate on a restricted (narrower) baseband bandwidth as compared to other terminal devices operating in a network.

The increasing use of different types of terminal devices associated with different operating bandwidths gives rise to new challenges for efficiently handling communications in wireless telecommunications systems that need to be addressed.

SUMMARY OF THE DISCLOSURE

The present disclosure can help address or mitigate at least some of the issues discussed above as defined in the appended claims.

Embodiments of the present technique can provide a method of receiving data at a communications device from an infrastructure equipment forming part of a radio network part of a wireless communications network. The method comprises receiving at the communications device one or more downlink transport blocks transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks, estimating the data carried by each of the one or more downlink transport blocks by performing an error correction decoding in accordance with the error correction encoding applied by the infrastructure equipment, wherein each of the one or more downlink transport blocks is transmitted repeatedly a plurality of times in a corresponding plurality of the time divided units of the wireless access interface, and the estimating the data carried by each of the downlink transport blocks comprises generating, for each repeated transmission of the downlink transport block, for each of a plurality of encoded data symbols of the transport block, a soft decision value for decoding the downlink transport block in accordance with an error correction encoding applied by the infrastructure equipment to the transport block, storing the soft decision values for each repeated transmission of the downlink transport block in a soft buffer for decoding, combining the soft decision values of each of the encoded data symbols from each of the repeated transmissions of the downlink transport block from the soft buffer to form for each of the encoded data symbols a combined soft decision value, and estimating the data carried by each of the downlink transport blocks from the combined soft decision values by performing the error correction decoding in accordance with the error correction encoding applied by the infrastructure equipment, wherein the combining the soft decision values includes determining that the soft decision values for one or more of the repeated transmissions of the downlink transport blocks for one or more of the plurality of physical resource blocks of the narrow bandwidth transmission were estimated in the presence of a transmission to another communications device from the infrastructure equipment in the one or more physical resource blocks, and excluding the determined soft decision values from the combined soft decision values for the corresponding encoded data symbols.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 5 schematically represents an arrangement of PRBs spanning a system BW and which are grouped into RBGs and which support a plurality of NB carriers in a wireless telecommunication system with one of the NB carriers being scheduled for use;

FIG. 6 shows an example of how a PDSCH may be decoded by a UE based on partitions of the UE's soft buffer memory;

FIG. 7 provides a graphical illustration of HARQ operation with a PDSCH which is repeatedly transmitted 8 times;

DETAILED DESCRIPTION OF THE EMBODIMENTS

Long Term Evolution (LTE) Wireless Communications System

Figure 1:
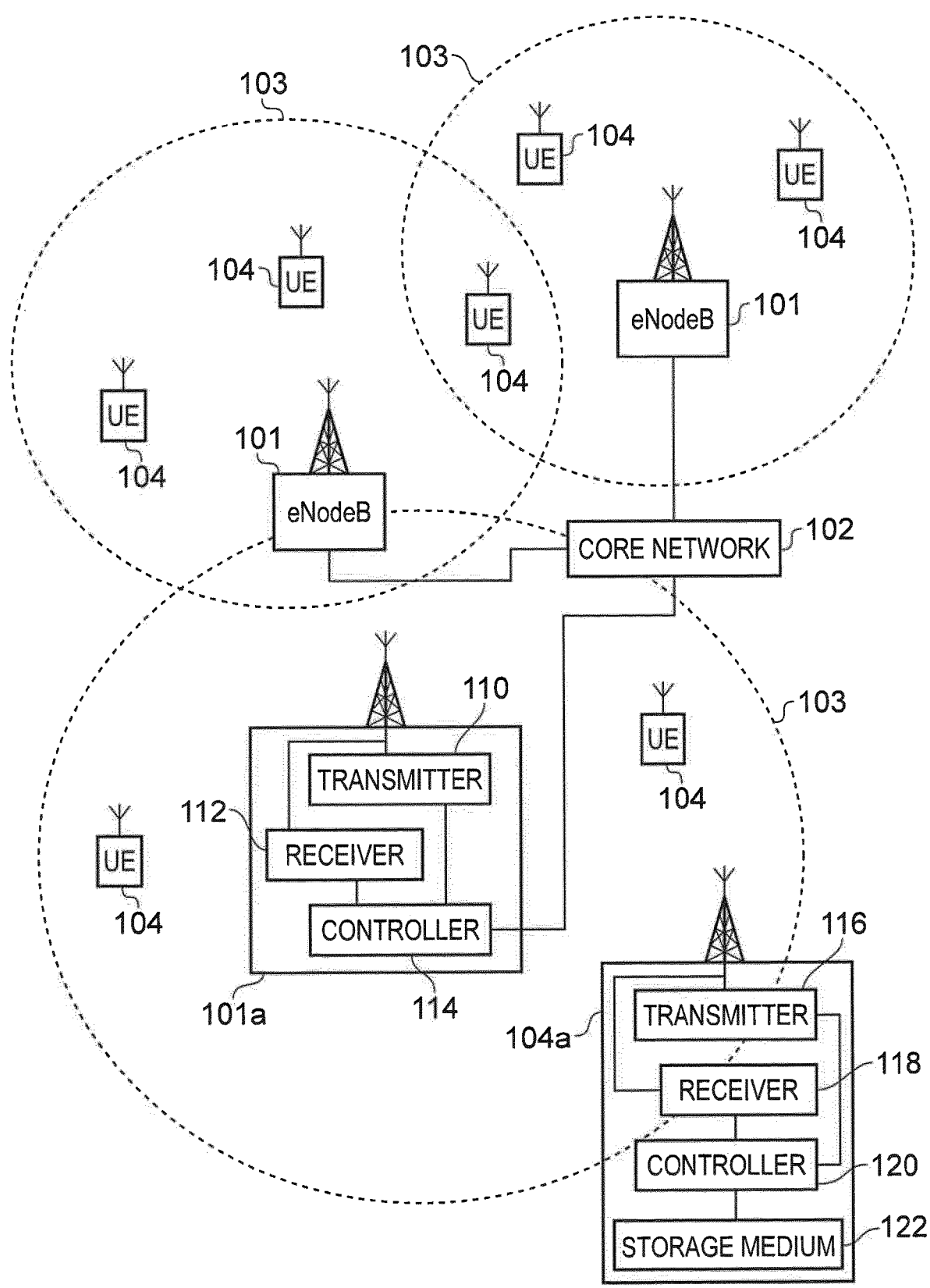
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RIM) body, and also described in many books on the subject, for example, Holma H. and Toskala A [5]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB/eNB), a general Node B (gNodeB/gNB) or a coordinating entity for example, and provides a wireless access interface to the one or more communications devices within a coverage area or cell represented by a broken line 103.

One or more mobile communications devices 104 may communicate data via the transmission and reception of signals representing data using the wireless access interface.

The core network 102 may also provide functionality including authentication, mobility management, charging and so on for the communications devices served by the network entity. The mobile communications devices of FIG. 1 may also be referred to as communications terminals, user equipment (UEs), communications devices, terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) or 5G/New Radio (NR) standard.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

In this example, the infrastructure equipment 101a comprises a transmitter 110 for transmission of wireless signals, a receiver 112 for reception of wireless signals and a controller 114 configured to control infrastructure equipment 101a to operate in accordance with embodiments of the present disclosure as described herein. The controller 114 may comprise various sub-units, such as a scheduler, for providing functionality in accordance with embodiments of the present disclosure as explained further below. These sub-units may be implemented as discrete hardware elements or as appropriately configured functions of the controller 114. Thus, the controller 114 may comprise a processor which is suitably configured/programmed to provide the desired functionality described herein using conventional programming/configuration techniques for equipment in wireless telecommunications systems. The transmitter 110, receiver 112 and controller 114 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the infrastructure equipment 101a will in general comprise various other elements associated with its operating functionality, such as a scheduler. For example, although not shown in FIG. 1 for simplicity, the controller 114 may comprise a scheduler, that is to say the controller 114 may provide the scheduling function for the base station.

An example UE 104a is shown in more detail to include a transmitter 116 for transmitting signals on the uplink of the wireless access interface to the eNodeB 101 and a receiver 118 for receiving signals transmitted by the base station 101 on the downlink via the wireless access interface. The UE 104a may also comprise a storage medium 122, such as a solid state memory or similar, for storing data. The transmitter 116, receiver 118 and storage medium 122 are controlled by a controller 120. In the embodiments of the present disclosure, the UE 104a is a communications device configured to operate using efeMTC (Even Further Enhanced Machine Type Communications) or feNB-IoT (Further Enhanced Narrowband Internet of Things). The controller 120 may comprise various sub-units for providing functionality in accordance with embodiments of the present disclosure as explained further herein. These sub-units may be implemented as discrete hardware elements or as appropriately configured functions of the controller 120. Thus the controller 120 may comprise a processor which is suitably configured/programmed to provide the desired functionality described herein using conventional programming/configuration techniques for equipment in wireless telecommunications systems. The transmitter 116, receiver 118 and controller 120 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/ circuitry. It will be appreciated the communications device 104a will in general comprise various other elements associated with its operating functionality, for example a power source, user interface, and so forth, but these are not shown in FIG. 1 in the interests of simplicity.

While certain embodiments may be generally described herein in relation to the network architecture represented in FIG. 1, it will be appreciated corresponding approaches may equally be adopted in networks conforming to other overall configurations, for example configurations associated with proposed approaches for new radio access technology (RAT), NR, wireless mobile telecommunications networks/ systems. A new RAT network may comprise communication cells that each comprise a controlling node in communication with a core network component and a plurality of distributed units (radio access nodes/remote transmission and reception points (TRPs)) within the cell. The distributed units may be responsible for providing the radio access interface for terminal devices connected to the NR network. Each distributed unit has a coverage area (radio access footprint) which defines the coverage of the communication cell. Each distributed unit includes transceiver circuitry for transmission and reception of wireless signals and processor circuitry configured to control the respective distributed units.

In terms of broad top-level functionality, the core network component of such a new RAT telecommunications system may be broadly considered to correspond with the core network 102 represented in FIG. 1, and the respective controlling nodes and their associated distributed units/ TRPs may be broadly considered to provide functionality corresponding to the base stations of FIG. 1. Thus, the term network infrastructure equipment/access node may be used to encompass these elements and more conventional base-station type elements of wireless telecommunications systems. Depending on the application at hand the responsibility for scheduling transmissions which are scheduled on the radio interface between the respective distributed units and the terminal devices may lie with the controlling node/ centralised unit and/or the distributed units/TRPs. A terminal device operating in this proposed new RAT architecture may thus exchange signalling with a first controlling node via one or more of the distributed units associated with the controlling node. In some implementations the involvement of the distributed units in routing communications from the terminal device to a controlling node (controlling unit) may be transparent to the terminal device. It will further be appreciated this example represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architecture shown in FIG. 1. It will be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node and/or a TRP in a new RAT architecture of the kind discussed above.

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED), and other RRC modes/states may also be supported. A terminal device in the idle mode may move to connected mode, for example because it needs to transmit uplink data or respond to a paging request, by undertaking a random access procedure, and a terminal device in the connected mode may move to the idle mode, for example because it has finished a current exchange of higher layer user plane data with the network, by undertaking an RRC connection release procedure. Radio Resource Control signalling is signalling exchanged between a terminal device and a network in support of the different RRC modes to control how radio resources are used/managed in the network. Examples of RRC signalling include signalling associated with RRC connection establishment and release functions, broadcast of system information (e.g. system information blocks, SIBs), radio bearer establishment, reconfiguration and release, RRC connection mobility procedures, paging notification and release and outer loop power control.

As noted above, it is proposed for wireless telecommunications systems to support some terminal devices, for example, Internet of Things (IoT) type terminal devices and Machine Type Communications (MTC) on a narrowband carrier operating within a wider system (host) frequency bandwidth. A terminal device configured to operate using a restricted subset of radio resources (narrowband carrier) spanning a host frequency bandwidth (host carrier) in this way may, for convenience of terminology, sometimes be referred to herein as a narrowband (NB) terminal device while a terminal device able to operate using the full host frequency bandwidth may, for convenience of terminology, sometimes be referred to herein as a legacy or non-narrowband terminal device. In this regard it will be appreciated the term "legacy" is used here simply to help distinguish between narrowband and non-narrowband terminal devices. The term is not to be interpreted as indicating such terminal devices are in any way outdated, but merely to indicate that they are configured to operate over the full operating bandwidth of the wireless telecommunications system in the usual/conventional way rather than being configured to operate within a restricted narrowband within the full operating bandwidth of the wireless telecommunications system.

Wireless telecommunications systems may have a range of different system bandwidths. For example, in an LTE context a system may have an overall operating bandwidth (system BW) of 1.4 MHz, 3 MHz, 5 MHz, 10 MHz, 15 MHz or 20 MHz. Radio resources are divided in frequency into subcarriers (which in LTE have a 15 kHz channel spacing) with 12 subcarriers corresponding to a physical resource block, PRB (in LTE a PRB has a time duration of 0.5 ms (half a subframe)). In the frequency dimension, the number of PRBs for a carrier depends on the system bandwidth as indicated in the first and second columns in Table 1.

TABLE 1

Parameterisation of RBG and narrowband with respect to system bandwidth

| System Bandwidth (MHz) | System Bandwidth (PRBs) | Number of 1.4 MHz Narrowband carriers | RBG size (NRB) |
|---|---|---|---|
| 1.4 MHz | 6 | 1 | 1 |
| 3 MHz | 15 | 2 | 2 |
| 5 MHz | 25 | 4 | 2 |
| 10 MHz | 50 | 8 | 3 |
| 15 MHz | 75 | 12 | 4 |
| 20 MHz | 100 | 16 | 4 | eMTC Narrowband

One approach for narrowband/small bandwidth operation in an LTE context is to use narrowbands with a bandwidth of 6 PRBs (i.e. 6×12=72 subcarriers) corresponding to a 1.4 MHz carrier (72 subcarriers with a 15 kHz spacing corresponds to 1.08 MHz but additional bandwidth is used for filtering, signal roll-off, etc.). Because the narrowband carrier bandwidth for an NB terminal device (1.4 MHz) is smaller than the maximum carrier bandwidth that a legacy terminal device must support (20 MHz in LTE), the NB terminal device can use a less complex transceiver (RF front end), which can help reduce manufacturing costs and power consumption during use. A system bandwidth may be wide enough to support multiple non-overlapping narrowband carriers at different frequency locations across the system bandwidth. For example, in an LTE context, all but the smallest system bandwidth (1.4 MHz) has the potential to support more than one 6 PRB wide narrowband (e.g. for eMTC operations). The potential number of different narrowbands for each system bandwidth in LTE is indicated in the third column in Table 1. The frequency locations for the narrowbands within a system frequency bandwidth may be fixed (e.g. predefined by an operating standard for the wireless telecommunications system).

In the general case the number of PRBs in a system bandwidth will not be an integer multiple of the number of PRBs in a narrowband. For example, with the exception of the smallest 1.4 MHz system bandwidth in LTE, dividing the total number of PRBs in the system bandwidth (second column in Table 1) into the number of potential narrowbands that can be supported (second column in Table 1) leaves some PRBs remaining (which may be referred to here as remaining PRBs). As noted above, the frequency locations for the narrowbands within a system frequency bandwidth may be predefined, and in an LTE context this is done in such a way that the narrowband locations and the remaining PRBs are both arranged symmetrically about the centre of the system bandwidth. For LTE the remaining PRBs are distributed such that if there is an even number of remaining PRBs they are located in equal numbers at the upper and lower ends of the system bandwidth. If there is an odd number of remaining PRBs, one is located at the centre of the system frequency bandwidth and any others are located in equal numbers at the upper and lower ends of the system bandwidth. The narrowbands are arranged contiguously between the remaining PRBs.

Figures 2, 3, 4:
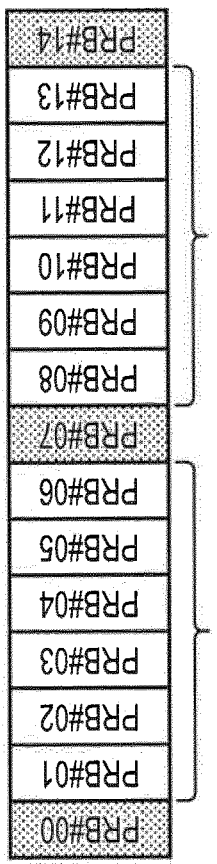
FIG. 2 schematically represents an arrangement of physical resource blocks (PRBs) that span a system bandwidth (BW) to support two narrowband (NB) carriers in a wireless telecommunication system.
FIG. 3 schematically represents an arrangement of PRBs that span a system BW and which are grouped into physical resource block groups (RBGs) in a wireless telecommunication system.
FIG. 4 schematically represents an arrangement of PRBs spanning a system BW and which are grouped into RBGs and which support a plurality of NB carriers in a wireless telecommunication system.

FIG. 2 schematically shows narrowband and remaining PRB locations arranged according to these principles for the example of a 3 MHz/15 PRB system bandwidth (System BW). Thus FIG. 2 schematically shows the 15 PRBs (labelled PRB #00, PRB #01 . . . , PRB #14) arranged in frequency from a lower end of the system bandwidth to an upper end of the system bandwidth (left to right in the figure). The 15 PRBs can support two 6 PRB narrowbands, labelled NB #0 and NB #1 in FIG. 2, with 3 PRBs remaining. The PRBs allocated to support narrowband operation are shown with no shading while the remaining PRBs (i.e. PRBs not allocated to support narrowband operation for this particular arrangement) are shown with shading. It will be appreciated that references herein to certain PRBs supporting narrowband operation are intended to mean these are the PRBs that may be used to support narrowband operation if desired, and at other times they may be used to support legacy/non-narrow band operation. That is to say the PRBs shown in the figures as being associated with narrowband operation indicate the potential narrowband locations supported within the system bandwidth. Whether any particular narrowband is active/scheduled for use at any given time (i.e. the corresponding PRBs are used for narrowband operation) or not currently active (i.e. the corresponding PRBs are free to be used for non-narrowband/legacy operation) may be determined in accordance with the general established principles for scheduling (i.e. allocating resources to) narrowband operation in a wireless telecommunications system).

Thus for the arrangement of FIG. 2 there are three remaining PRBs (i.e. PRBs not used to support any narrowband), and so one is located in the middle of the system frequency band (PRB #07) and one is located at each end of the system frequency band (PRB #00 and PRB #14). A first narrowband, NB #0, is formed using {PRB #01, PRB #02, PRB #03, PRB #04, PRB #05, PRB #06} and a second narrowband, NB #1, is formed using {PRB #08, PRB #09. PRB #10, PRB #1 PRB #12, PRB #13}.

Resource Block Group (RBG)

It is common for PRBs in wireless telecommunications system to be divided into a plurality of predefined groups of physical resource blocks (i.e. resource block groups, RBGs) which are scheduled together. For example, in LTE, the resource allocation on the physical downlink shared channel (PDSCH) typically uses what is known as Resource Allocation Type 0. For this the system bandwidth is divided into Resource Block Groups (RBGs) consisting of $N_{RB}$ PRBs (if the number of PRBs for the system bandwidth is not an integer multiple of $N_{RB}$ the leftover PRBs may form a final RBG with fewer than $N_{RB}$ PRBs). An RBG is the granularity of resource allocation for PDSCH (i.e. the smallest allocation that can be made), i.e. the downlink resources are allocated in numbers of RBGs for the terminal device. This restriction helps provide a balance between scheduling flexibility and control signalling overhead. For LTE the value $N_{RB}$ is dependent upon the system bandwidth and is indicated in the fourth column in Table 1.

FIG. 3 schematically shows a known arrangement of RBGs for the example of an LTE 10 MHz/50 PRB system bandwidth (System BW). Thus FIG. 3 schematically shows the 50 PRBs (labelled PRB #00, PRB #01 . . . , PRB #49) arranged in frequency from a lower end of the system bandwidth to an upper end of the system bandwidth (left to right in the figure). As indicated in Table 1, for this system bandwidth the RGB size $N_{RB}$ is 3 PRB so the 50 PRBs can support sixteen 3-PRB RGBs (labelled RGB #00, RGB #01 . . . , RGB #15) and one 2 PRB RGB (labelled RGB #16), i.e. a total of 17 RBG.

RBG and Narrowband Misalignment

It has been recognised [6] that the RBG in LTE and the narrowbands in eMTC are not aligned. FIG. 4 is similar to, and will be understood from, FIG. 3, but additionally shows this misalignment for a 10 MHz system bandwidth. Eight eMTC narrowbands are arranged in the 50 PRB system bandwidth such that they are centred with the 2 unused PRBs placed at both edges of the system bandwidth. It can be observed that the RBGs and narrowbands are not PRB aligned, i.e. they do not start from the same PRB.

A consequence of this misalignment between RBG and eMTC narrowband is that, in a system that supports both LIE and eMTC. RBGs that overlap with a used narrowband cannot be scheduled. An example for a 10 MHz system bandwidth is shown in FIG. 5, which is again similar to, and will be understood from, FIGS. 3 and 4. Here, Narrowband #03 is scheduled which uses {PRB #19, PRB #20, PRB #21, PRB #22, PRB #23, PRB #24} (shown highlighted in with dashed lines). As described previously, RBG is the smallest granularity for PDSCH resource allocation and it can be observed that since PRB #19 & PRB #20 are used in the narrowband #03, RBG #06 cannot be used by LIE UEs, which causes PRB #18 to be blocked from usage by LIE UEs. Similarly, PRB #24 is occupied which blocks the usage of RBG #08 despite the majority of RBG #08's PRBs {PRB #25 & PRB #26} being free. This leads to degradation in the cell throughput/spectral efficiency for the LTE system.

HARQ for MTC Devices

As is well understood, various wireless telecommunications networks support hybrid automatic repeat request (HARQ) transmissions. A HARQ transmission is essentially a hybrid combination of standard ARQ-error control and forward error correction (FEC) coding. In a HARQ transmission, a transport block (TB), e.g. such as a PDSCH TB, occupies a HARQ process where each HARQ process consists of the transmission of the TB and an acknowledgement to that TB. If a negative acknowledgement (NACK) is fed back, a retransmission for that TB occurs otherwise a new TB occupies this HARQ Process.

In order to support hybrid ARQ (HARQ), the UE implements soft buffer memory. The soft buffer memory is used to store log-likelihood ratio information on each received physical bit of the received transport block. The number of soft-buffer memory locations per HARQ process is approximately equal to:

$$N_{soft}=(TBS+CRC\_size)/code\_rate$$

There are sufficient HARQ processes to support the round trip time (RTT) in eMTC (time from allocating some PDSCH resource in the DL to receiving an acknowledgement and scheduling a subsequent transmission/re-transmission). The eMTC RTT is 10 subframes, so the UE supports soft buffer memory sufficient for 10 HARQ processes (though some UEs only have the capability to support 8 HARQ processes). PDSCH operation with 10 HARQ processes is shown in FIG. 6.

The operation shown in FIG. 6 is described below:

PDSCH is allocated in HARQ process 0 via MPDCCH. There is a two subframe gap between the MPDCCH and PDSCH.

The UE processes the PDSCH (including physical channel processing and Turbo decoding). This takes 4 subframes, by which time an ACK/NACK indication is sent to the eNodeB in the UL using the PUCCH channel.

The eNodeB receives the PUCCH. The eNB takes four subframes to decode the PUCCH and make a scheduling decision. The eNB schedules a new transport block on PDSCH using the MPDCCH to indicate the PDSCH that is being scheduled.

Hence it is seen that HARQ process 0 can only be used every $10^{th}$ subframe. In order to support continuous transmission of PDSCH, 10 HARQ processes are necessary (as shown), with the UE being assigned PDSCH targeted at a different HARQ process in each of the 10 subframes. The received LLRs (logarithmic likelihood ratio, which is a form of soft decision bit) for the PDSCH are stored in soft buffer memory that is associated with each HARQ process.

Hence, by supporting soft buffer memory for 10 HARQ processes, it is possible to schedule the UE with a new transport block every subframe and achieve the peak data rate of 1 Mbps. This peak data rate is only possible in good channel conditions.

When the coverage is more challenging, the PDSCH transmission is repeated. The repeated transmissions increase the amount of energy received per bit at the UE until the transport block can be decoded. When PDSCH transmissions are repeated, the UE does not need to support as many HARQ processes, as illustrated in FIG. 7. FIG. 7 shows that only 2 HARQ processes are used in deeper coverage scenarios (in this case, at coverage equivalent to 8-times repetition of PDSCH). When 2 HARQ processes are used, only 2 out of the 10 parts of the soft buffer memory are used. There are 8 (=10−2) unused parts of soft buffer memory.

It should be noted that FIG. 7 shows one subframe not allocated to PDSCH. According to different scheduling strategies, a third HARQ process could be employed. This third HARQ process would lead to a small increase in throughput to the UE.

Embodiments of the present technique allow LTE UEs to be scheduled with RBGs, while eMTC UEs are scheduled in narrowbands, while making efficient use of the UE's soft buffer memory.

Reception of eMTC Transmission in Soft Buffer Parts

Figure 8:
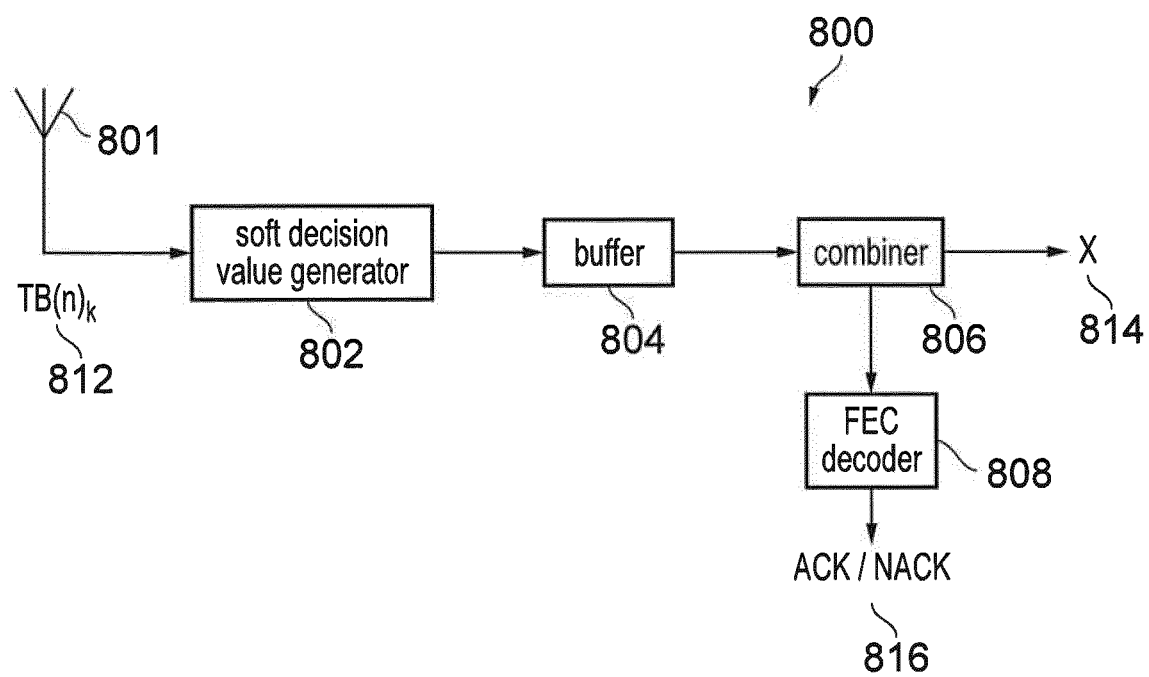
FIG. 8 shows an example schematic block diagram representation of a receiver, which may form part of a UE, configured in accordance with embodiments of the present technique.

FIG. 8 shows a schematic block diagram representation of a receiver 800 configured in accordance with embodiments of the present technique. The receiver 800 may form part of a communications device, or UE, which is configured to receive data from an infrastructure equipment forming part of a radio network part of a wireless communications network. The infrastructure equipment and communications device each comprise a transceiver (or transceiver circuitry) and a controller (or controller circuitry). Each of the controllers may be, for example, a microprocessor, a CPU, or a dedicated chipset, etc. It will be appreciated by those skilled in the art that, in arrangements of the present technique, the transceiver of the communications device may not always include a transmitter or a capability for transmission, for example in scenarios where the communications device is a low-power wearable device which only receives data.

The receiver 800 comprises receiving means 801 (e.g. an antenna), a soft decision value generating means 802, a buffer 804, a combiner 806 and a decoding means 808. The receiving means 801 is configured to receive one or more downlink transport blocks 812 transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks.

The receiver 800 is configured to estimate the data carried by each of the one or more downlink transport blocks by performing an error correction decoding in accordance with the error correction encoding applied by the infrastructure equipment, wherein each of the one or more downlink transport blocks is transmitted repeatedly a plurality of times in a corresponding plurality of the time divided units of the wireless access interface. As a non-limiting example, there are n received transport blocks 812 as shown in FIG. 8, and each of these is repeated k times.

The estimating the data carried by each of the downlink transport blocks by the receiver 800 comprises the soft decision value generator 802 being configured to generate, for each repeated transmission of the downlink transport block, for each of a plurality of encoded data symbols of the transport block, a soft decision value for decoding the downlink transport block in accordance with an error correction encoding applied by the infrastructure equipment to the transport block, the buffer 804 being configured to store the soft decision values for each repeated transmission of the downlink transport block in a soft buffer for decoding, the combiner 806 being configured to combine the soft decision values of each of the encoded data symbols from each of the repeated transmissions of the downlink transport block from the soft buffer to form for each of the encoded data symbols a combined soft decision value, and the decoding means 808, which may be for example a forward error correction (FEC) decoder, being configured to estimate the data carried by each of the downlink transport blocks from the combined soft decision values by performing the error correction decoding in accordance with the error correction encoding applied by the infrastructure equipment.

The combining the soft decision values by the combiner 806 includes the combiner 806 being configured to determine that the soft decision values for one or more of the repeated transmissions of the downlink transport blocks for one or more of the plurality of physical resource blocks of the narrow bandwidth transmission were estimated in the presence of a transmission to another communications device from the infrastructure equipment in the one or more physical resource blocks, and to exclude 814 the determined soft decision values from the combined soft decision values for the corresponding encoded data symbols.

In some arrangements of the present technique, the output of the decoding process is a positive or negative acknowledgement (ACK/NACK) indication 816 of the received data, which may be transmitted to the eNodeB in a PUCCH. In other words, the receiving at the communications device the one or more downlink transport blocks comprises receiving the one or more downlink transport blocks for each of one or more automatic repeat request, ARQ, type transmissions from the infrastructure equipment, and the method carried out by the receiver 800 further comprises determining, using the estimate of the data carried by the downlink transport block, whether to transmit a feedback message to the infrastructure equipment comprising an acknowledgment or a negative acknowledgement, or no feedback message in accordance with the ARQ-type protocol, and if it is determined to transmit the feedback message, transmitting the determined feedback message, to the infrastructure equipment from the communications device.

As described by way of the example block diagram of FIG. 8, when the UE receives a repeated PDSCH transmission in either CE Mode B or CE Mode A, it stores the LLRs for portions of those receptions in different parts of the soft buffer memory. It then decodes the transport block based on different combinations of the soft buffer memory. In some example arrangements, discussed below under the sub-heading "Hypothesis-based Decoding," the combinations of soft buffer memory that are used are determined by the UE. In other words, the method step of determining the soft decision values estimated in the presence of the transmission to the other communications device comprises assuming that one or more of the repeated transmissions of the downlink transport block has been received in the presence of the transmission to the other communications device, re-estimating the data carried by the downlink transport block by performing the error correction decoding on the combined soft decision values excluding those soft decision values generated from the assumed one or more repeated transmissions of the downlink transport block received in the presence of the transmission to the other communications device, and determining that the estimation of the data carried by each of the downlink transport blocks from the combined soft decision values has been estimated correctly, and if not, assuming that a different one or more of the repeated transmissions of the downlink transport block has been received in the presence of the transmission to the other communications device and repeating the re-estimating.

In other example arrangements, discussed below under the sub-heading "Indication of the Impacted Resources," the combinations of soft buffer memory that are used are chosen by the UE with the aid of information from the eNodeB. In other words, the method comprises receiving an indication from the infrastructure equipment of the one or more of the plurality of physical resource blocks of the narrow bandwidth downlink transmission of each transport block which overlap with physical resource blocks in which the infrastructure equipment is also transmitting downlink signals to the other communications device, the soft decision values estimated in the presence of the transmission to the other communications device being determined from the indication received from the infrastructure equipment.

Figure 9:
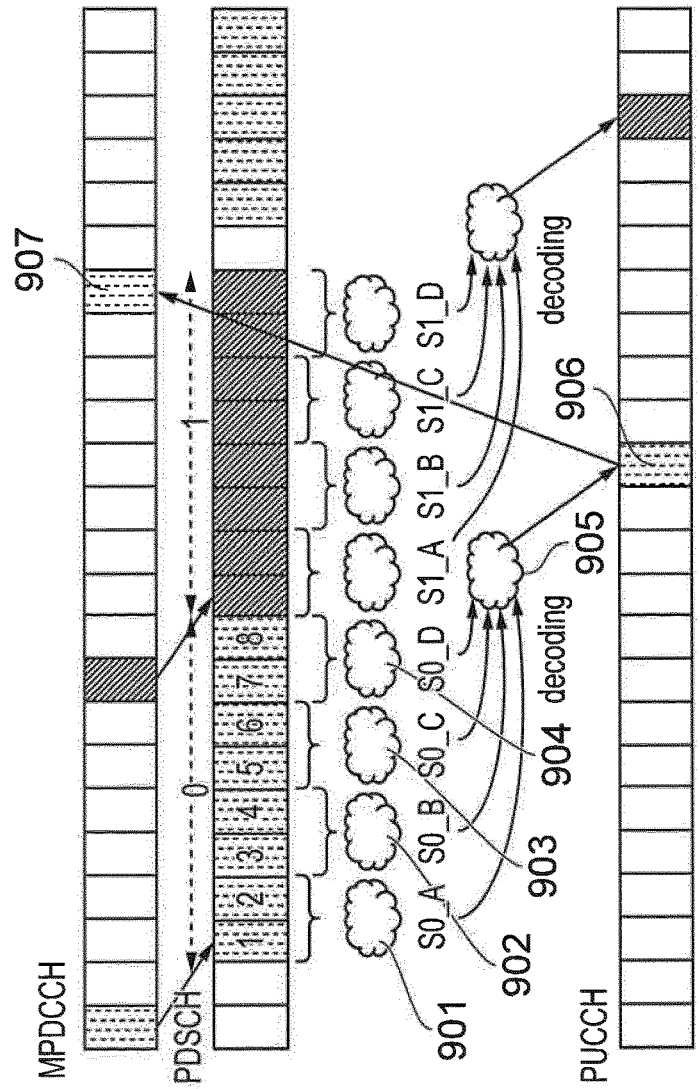
FIG. 9 shows an example arrangement of how a PDSCH may be decoded by a UE based on partitions of the UE's soft buffer memory in accordance with embodiments of the present technique.

For example, in a case where the UE is scheduled on PDSCH with REP8 (i.e. with a repetition level of 8) as shown in FIG. 7, the UE applies 4 parts of its soft buffer memory to HARQ process 0 (the parts are labelled S0_A, S0_B, S0_C, S0_D in FIG. 9) and 4 parts of its soft buffer memory to HARQ process 1 (the parts are labelled S1_A, S1_B, S1_C, S1_D in FIG. 9). This operation is shown in FIG. 9.

Figure 10:
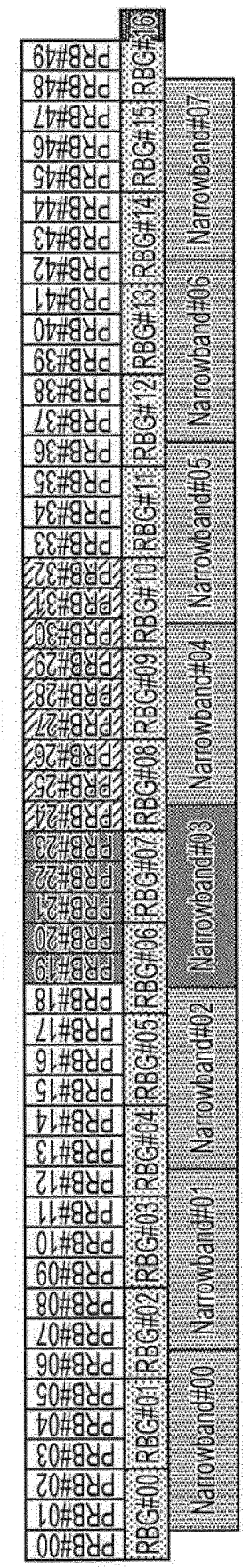
FIG. 10 illustrates an example of an LTE transmission overlapping an eMTC narrowband.

In FIG. 9, it can be seen that:
Soft bits for the first two subframes of HARQ process 0 are stored in part S0_A of the UE's soft buffer 901.
Soft bits for subframes three and four of HARQ process 0 are stored in part S0_B of the UE's soft buffer 902.
Soft bits for subframes five and six of HARQ process 0 are stored in part S0_C of the UE's soft buffer 903.
Soft bits for subframes seven and eight of HARQ process 0 are stored in part S0_D of the UE's soft buffer 904.
Once all of the repetitions of HARQ process 0 have been stored in soft buffer parts S0_A, S0_B, S0_C and S0_D, the soft bit values in these four soft buffer parts are decoded 905 (e.g. using a Turbo decoder). The decoder combines the LLRs in the different soft buffer parts (e.g. it adds the LLRs in each of the soft buffer parts prior to Turbo decoding).
The output of the decoding process is an ACK/NACK indication 906 which is sent to the eNB 907 in a PUCCH.
This process is then repeated for HARQ process 1, and so on, as shown in FIG. 9.
The case where there is a PDSCH transmission for an LTE UE (e.g. a smartphone) should be considered, where an RBG of that PDSCH transmission overlaps the eMTC narrowband, as shown in FIG. 10.
FIG. 10 shows that in one of the subframes. PRB #24 is not allocated to the eMTC UE (as part of narrowband #03), but is instead allocated to the LTE UE (as part of RBG #08). This will cause a corruption of the PDSCH that is received by the eMTC UE.

Figure 11:
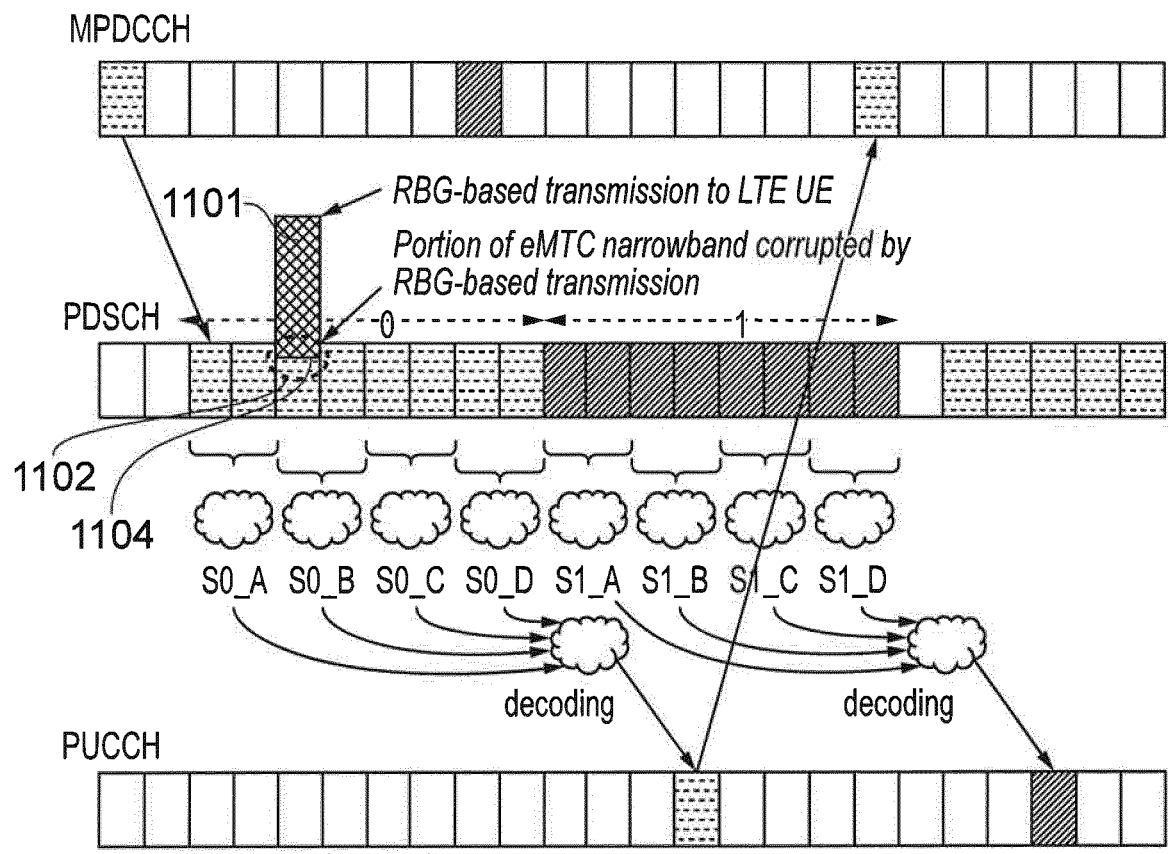
FIG. 11 shows an example of how an eMTC UE's reception of narrowband transmissions may be corrupted by RBG transmissions to an LTE UE.

FIG. 11 shows the effect of the corrupted PDSCH on the eMTC UE. The RBG-based transmission to the eMTC UE 1101 is shown as overlapping a subframe 1102 whose soft bits are stored in soft buffer part S0_B by the eMTC UE. The marked portion 1104 of the eMTC narrowband, whose soft bits are stored in soft buffer part S0_B, corrupts the eMTC narrowband.

Because the UE has stored different parts (different subframes) of the received PDSCH in different soft buffer parts, the following techniques, which were briefly discussed above, can be applied to decode the PDSCH.

Indication of the Impacted Resources

In these example arrangements, as discussed above, those sets of repetitions that were impacted by the smartphone LTE transmission's RBGs overlapping the MTC transmission are indicated (as described, for example, in co-pending European patent application filed with application number EP17176495).

The indicator can be carried in a separate physical channel following the PDSCH transmission. In an example arrangement, this indication is transmitted using a subsequent DCI carried in an MPDCCH. In other words, the indication is received from the infrastructure equipment via downlink control information, DCI, carried by a physical downlink control channel.

The UE can then either:
a) Discard the soft bits in the soft buffer parts corresponding to impacted resources and perform Turbo decoding on the other soft buffer parts. For example, if the UE is signalled the third subframe of the PDSCH shown in FIG. 11 had been impacted, it would discard the soft bits in soft buffer part S0_B and Turbo decode based on soft buffers S0_A, S0_C and S0_D. In other words, the soft buffer comprises a plurality of soft buffer portions in each of which a plurality of the soft decision values are stored, and wherein the communications device is configured to discard all of the soft decision values in each of the buffer portions which comprise one or more of the soft decision values for each transport block comprising the one or more physical resource blocks which overlap with physical resource blocks in which the infrastructure equipment is also transmitting downlink signals to the other communications device.
b) Re-process the soft buffers that had been impacted. For example if the third subframe of FIG. 11 is known to have been impacted, the UE would reprocess soft buffer S0_B, discarding those LLRs that could have potentially been impacted by a smartphone-LTE RBG. It should be noted that the contents of the soft buffer can be arranged such that certain locations in the soft buffer part are known to be associated with certain PRBs. For example, for the overlapping transmissions shown in FIG. 10, the UE will know that the potential corruption occurs in PRB #24. If the eNodeB indicates that there has been a corruption in the third subframe of the PDSCH shown in FIG. 11, then the UE can re-process soft buffer part S0_B to exclude soft bits associated with PRB #24 and then decode based on soft buffer parts S0_A, S0_C, S0_D and the re-processed S0_B. In other words, the soft buffer comprises a plurality of soft buffer portions in each of which a plurality of the soft decision values are stored, and wherein the communications device is configured to discard from each of the buffer portions any of the soft decision values for each transport block comprising the one or more physical resource blocks which overlap with physical resource blocks in which the infrastructure equipment is also transmitting downlink signals to the other communications device.

c) In a more advanced implementation, the eNB indicates the sub-portion within a repetition portion (i.e. the portion of the repetition stored in the soft buffer) that is affected. This can be an indication of which PRB within the narrowband in a specific repetition portion had been corrupted and the UE will flush the corresponding portion in the soft buffer. This avoids discarding an entire repetition portion if only a small percentage (e.g. 1 PRB out of 6 PRBs) is affected. In other words, the communications device is configured, when estimating the data carried by each of the one or more downlink transport blocks by performing an error correction decoding in accordance with the error correction encoding applied by the infrastructure equipment, to exclude each of the one or more of the plurality of physical resource blocks of the narrow bandwidth downlink transmission of each transport block which overlap with physical resource blocks in which the infrastructure equipment is also transmitting downlink signals to the other communications device.

Hypothesis-Based Decoding

In these example arrangements, as discussed above, the UE may perform hypothesis-based decoding on the soft buffers. Hypothesis-based decoding decodes different permutations and combinations of the soft buffer parts. For example, the UE performs decoding based on the following sets of soft buffer parts a. S0_A, S0_B, S0_C, S0_D. The hypothesis is that there was no corruption.
b. S0_A, S0_B, S0_C. The hypothesis is that there was corruption in S0_D.
c. S0_A, S0_C, S0_D. The hypothesis is that there was corruption in S0_B. In the example shown in FIG. 11, this hypothesis is likely to lead to correct decoding of the PDSCH
d. Etc.

Alternatively, the UE may perform hypothesis-based decoding on certain sections of the soft buffers parts. For example, the UE does hypothesis-based decoding on hypotheses that:

a. No soft buffer is corrupted by an LTE smartphone-RBG
b. One PRB is corrupted by a smartphone-RBG
c. One PRB in soft buffer 0 is corrupted by a smartphone-RBG
d. One PRB in soft buffer part S0_B is corrupted by a smartphone RBG
e. Etc.

Other Aspects

In an aspect of the present technique (that is applicable to both the above example arrangements of "Hypothesis-based Decoding" and "Indication of the Impacted Resources"), the UE is told by RRC signaling the number of soft buffers it can use for assigning its soft buffer parts. The UE then determines the number of soft buffer parts that it can assign to each HARQ process. In other words, the method comprises receiving, via radio resource control, RRC, signalling from the wireless communications network, an indication of a number of soft buffer portions which may form the soft buffer, and determining, based on the indicated number of soft buffer portions, a number of the soft buffer portions which the communications device is able to assign for each of the one or more ARQ type transmissions.

In one example of this above aspect, if the eNodeB indicates that it will have a maximum of two simultaneously active HARQ processes, the UE would understand that all its soft buffer memory could be split into two sets of 5 soft buffer parts (5 soft buffer parts for each HARQ process) and decode accordingly. In a second example, if the eNodeB indicates that the maximum transport block size that it would schedule is 500 bits (instead of the maximum 1000 bits size of the buffer) and that it will have a maximum of two simultaneously active HARQ processes, the UE would understand that all its soft buffer memory could be split into two sets of 10 soft buffer parts (10 soft buffer parts for each HARQ process) and would decode accordingly.

Figure 12A:
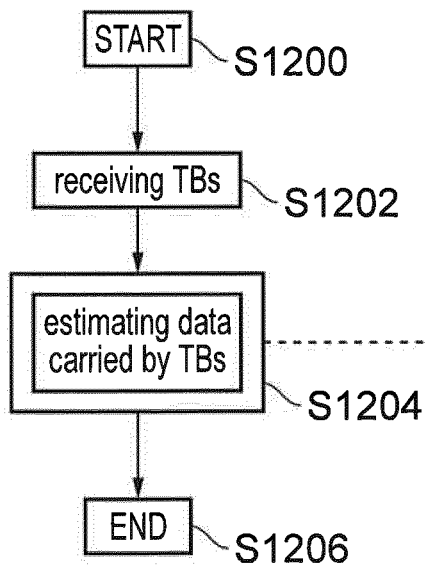
FIG. 12A to 12C show three flow diagrams illustrating processes of communications in a communications system in accordance with embodiments of the present technique.
Figure 12B:
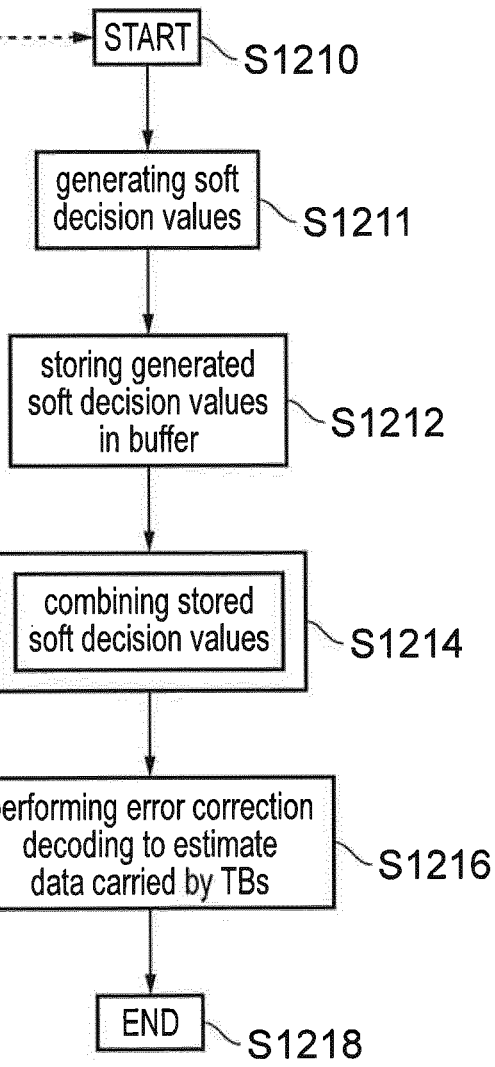
Figure 12C:
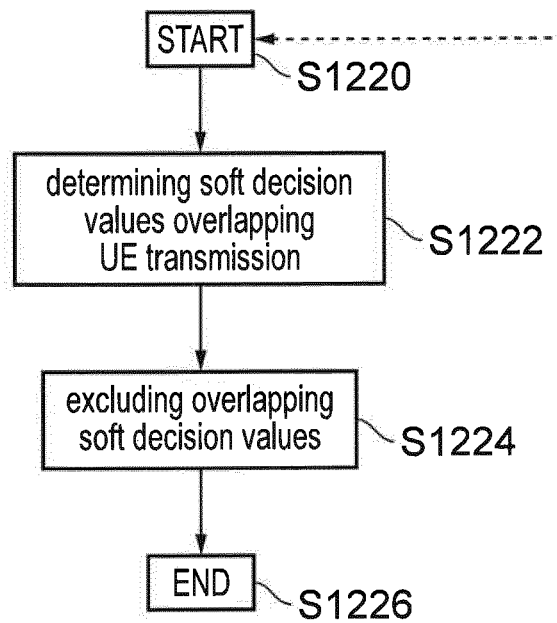

FIGS. 12A to 12C show three flow diagrams illustrating processes of communications in a communications system comprising an infrastructure equipment (e.g. an eNodeB) and a UE in accordance with embodiments of the present technique. The processes shown by each of FIGS. 12A to 12C are methods of receiving data at the UE from the eNodeB, which forms part of a radio network part of a wireless communications network.

The first, primary, process, which is illustrated by FIG. 12A, starts in step S1200. The method comprises, in step S1202, receiving at the UE one or more downlink transport blocks transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks. In step S1204, the method comprises estimating the data carried by each of the one or more downlink transport blocks by performing an error correction decoding in accordance with the error correction encoding applied by the eNodeB, wherein each of the one or more downlink transport blocks is transmitted repeatedly a plurality of times in a corresponding plurality of the time divided units of the wireless access interface. The process ends in step S1206.

FIG. 12B shows in more detail the process involved during the step S1204 of estimating the data carried by each of the downlink transport blocks as shown in FIG. 12A. The process starts in step S1210. In step S1211, the method comprises generating, for each repeated transmission of the downlink transport block, for each of a plurality of encoded data symbols of the transport block, a soft decision value for decoding the downlink transport block in accordance with an error correction encoding applied by the eNodeB to the transport block. The process then advances to step S1212, which comprises storing the soft decision values for each repeated transmission of the downlink transport block in a soft buffer for decoding. The process then comprises, in step S1214, combining the soft decision values of each of the encoded data symbols from each of the repeated transmissions of the downlink transport block from the soft buffer to form for each of the encoded data symbols a combined soft decision value, and in step S1216, the method comprises estimating the data carried by each of the downlink transport blocks from the combined soft decision values by performing the error correction decoding in accordance with the error correction encoding applied by the eNodeB. The process ends in step S1218.

FIG. 12C shows in more detail the process involved during the step S1214 of combining the soft decision values as shown in FIG. 12B. The process starts in step S1220. In step S1222, the process includes determining that the soft decision values for one or more of the repeated transmissions of the downlink transport blocks for one or more of the plurality of physical resource blocks of the narrow bandwidth transmission were estimated in the presence of a transmission to another UE from the eNodeB in the one or more physical resource blocks. The process then comprises, in step S1224, excluding the determined soft decision values from the combined soft decision values for the corresponding encoded data symbols. The process ends in step S1226.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of receiving data at a communications device from an infrastructure equipment forming part of a radio network part of a wireless communications network, the method comprising
  receiving at the communications device one or more downlink transport blocks transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks,
  estimating the data carried by each of the one or more downlink transport blocks by performing an error correction decoding in accordance with the error correction encoding applied by the infrastructure equipment, wherein each of the one or more downlink transport blocks is transmitted repeatedly a plurality of times in a corresponding plurality of the time divided units of the wireless access interface, and the estimating the data carried by each of the downlink transport blocks comprises
  generating, for each repeated transmission of the downlink transport block, for each of a plurality of encoded data symbols of the transport block, a soft decision value for decoding the downlink transport block in accordance with an error correction encoding applied by the infrastructure equipment to the transport block,
  storing the soft decision values for each repeated transmission of the downlink transport block in a soft buffer for decoding,
  combining the soft decision values of each of the encoded data symbols from each of the repeated transmissions of the downlink transport block from the soft buffer to form for each of the encoded data symbols a combined soft decision value, and
  estimating the data carried by each of the downlink transport blocks from the combined soft decision values by performing the error correction decoding in accordance with the error correction encoding applied by the infrastructure equipment, wherein the combining the soft decision values includes
  determining that the soft decision values for one or more of the repeated transmissions of the downlink transport blocks for one or more of the plurality of physical resource blocks of the narrow bandwidth transmission were estimated in the presence of a transmission to another communications device from the infrastructure equipment in the one or more physical resource blocks, and
  excluding the determined soft decision values from the combined soft decision values for the corresponding encoded data symbols.

Paragraph 2. A method according to Paragraph 1, comprising
  receiving an indication from the infrastructure equipment of the one or more of the plurality of physical resource blocks of the narrow bandwidth downlink transmission of each transport block which overlap with physical resource blocks in which the infrastructure equipment is also transmitting downlink signals to the other communications device, the soft decision values estimated in the presence of the transmission to the other communications device being determined from the indication received from the infrastructure equipment.

Paragraph 3. A method according to Paragraph 2, wherein the indication is received from the infrastructure equipment via downlink control information, DCI, carried by a physical downlink control channel.

Paragraph 4. A method according to Paragraph 2 or Paragraph 3, wherein the soft buffer comprises a plurality of soft buffer portions in each of which a plurality of the soft decision values are stored, and
  wherein the communications device is configured to discard all of the soft decision values in each of the buffer portions which comprise one or more of the soft decision values for each transport block comprising the one or more physical resource blocks which overlap with physical resource blocks in which the infrastructure equipment is also transmitting downlink signals to the other communications device.

Paragraph 5. A method according to any of Paragraphs 2 to 4, wherein the soft buffer comprises a plurality of soft buffer portions in each of which a plurality of the soft decision values are stored, and
  wherein the communications device is configured to discard from each of the buffer portions any of the soft decision values for each transport block comprising the one or more physical resource blocks which overlap with physical resource blocks in which the infrastructure equipment is also transmitting downlink signals to the other communications device.

Paragraph 6. A method according to any of Paragraphs 2 to 5, wherein the soft buffer comprises a plurality of soft buffer portions in each of which a plurality of the soft decision values are stored, and
  wherein the communications device is configured, when estimating the data carried by each of the one or more downlink transport blocks by performing an error correction decoding in accordance with the error correction encoding applied by the infrastructure equipment, to exclude each of the one or more of the plurality of physical resource blocks of the narrow bandwidth downlink transmission of each transport block which overlap with physical resource blocks in which the infrastructure equipment is also transmitting downlink signals to the other communications device.

Paragraph 7. A method according to any of Paragraphs 1 to 6, wherein the determining the soft decision values estimated in the presence of the transmission to the other communications device comprises assuming that one or more of the repeated transmissions of the downlink transport block has been received in the presence of the transmission to the other communications device, re-estimating the data carried by the downlink transport block by performing the error correction decoding on the combined soft decision values excluding those soft decision values generated from the assumed one or more repeated transmissions of the downlink transport block received in the presence of the transmission to the other communications device, and determining that the estimation of the data carried by each of the downlink transport blocks from the combined soft decision values has been estimated correctly, and if not, assuming that a different one or more of the repeated transmissions of the downlink transport block has been received in the presence of the transmission to the other communications device and repeating the re-estimating.

Paragraph 8. A method according to any of Paragraphs 1 to 7, wherein the receiving at the communications device the one or more downlink transport blocks comprises receiving the one or more downlink transport blocks for each of one or more automatic repeat request, ARQ, type transmissions from the infrastructure equipment.

Paragraph 9. A method according to Paragraph 8, comprising determining, using the estimate of the data carried by the downlink transport block, whether to transmit a feedback message to the infrastructure equipment comprising an acknowledgment or a negative acknowledgement, or no feedback message in accordance with the ARQ-type protocol, and if determined to transmit the feedback message, transmitting the determined feedback message, to the infrastructure equipment from the communications device.

Paragraph 10. A method according to Paragraph 8 or Paragraph 9 comprising receiving, via radio resource control, RRC, signalling from the wireless communications network, an indication of a number of soft buffer portions which may form the soft buffer, and determining, based on the indicated number of soft buffer portions, a number of the soft buffer portions which the communications device is able to assign for each of the one or more ARQ type transmissions.

Paragraph 11. A communications device configured to receive data from an infrastructure equipment forming part of a radio network part of a wireless communications network, wherein the communications device comprises transceiver circuitry and controller circuitry which are configured in combination to receive one or more downlink transport blocks transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks, to estimate the data carried by each of the one or more downlink transport blocks by performing an error correction decoding in accordance with the error correction encoding applied by the infrastructure equipment, wherein each of the one or more downlink transport blocks is transmitted repeatedly a plurality of times in a corresponding plurality of the time divided units of the wireless access interface, wherein the controller circuitry and transceiver circuitry are configured in combination to estimate the data carried by each of the downlink transport blocks by being configured to generate, for each repeated transmission of the downlink transport block, for each of a plurality of encoded data symbols of the transport block, a soft decision value for decoding the downlink transport block in accordance with an error correction encoding applied by the infrastructure equipment to the transport block, to store the soft decision values for each repeated transmission of the downlink transport block in a soft buffer for decoding, to combine the soft decision values of each of the encoded data symbols from each of the repeated transmissions of the downlink transport block from the soft buffer to form for each of the encoded data symbols a combined soft decision value, and to estimate the data carried by each of the downlink transport blocks from the combined soft decision values by performing the error correction decoding in accordance with the error correction encoding applied by the infrastructure equipment, wherein the controller circuitry and transceiver circuitry are configured in combination to combine the soft decision values by being configured to determine that the soft decision values for one or more of the repeated transmissions of the downlink transport blocks for one or more of the plurality of physical resource blocks of the narrow bandwidth transmission were estimated in the presence of a transmission to another communications device from the infrastructure equipment in the one or more physical resource blocks, and to exclude the determined soft decision values from the combined soft decision values for the corresponding encoded data symbols.

Paragraph 12. Circuitry for a communications device configured to receive data from an infrastructure equipment forming part of a radio network part of a wireless communications network, wherein the communications device comprises transceiver circuitry and controller circuitry which are configured in combination to receive one or more downlink transport blocks transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks, to estimate the data carried by each of the one or more downlink transport blocks by performing an error correction decoding in accordance with the error correction encoding applied by the infrastructure equipment, wherein each of the one or more downlink transport blocks is transmitted repeatedly a plurality of times in a corresponding plurality of the time divided units of the wireless access interface, wherein the controller circuitry and transceiver circuitry are configured in combination to estimate the data carried by each of the downlink transport blocks by being configured to generate, for each repeated transmission of the downlink transport block, for each of a plurality of encoded data symbols of the transport block, a soft decision value for decoding the downlink transport block in accordance with an error correction encoding applied by the infrastructure equipment to the transport block, to store the soft decision values for each repeated transmission of the downlink transport block in a soft buffer for decoding, to combine the soft decision values of each of the encoded data symbols from each of the repeated transmissions of the downlink transport block from the soft buffer to form for each of the encoded data symbols a combined soft decision value, and to estimate the data carried by each of the downlink transport blocks from the combined soft decision values by performing the error correction decoding in accordance with the error correction encoding applied by the infrastructure equipment, wherein the controller circuitry and transceiver circuitry are configured in combination to combine the soft decision values by being configured to determine that the soft decision values for one or more of the repeated transmissions of the downlink transport blocks for one or more of the plurality of physical resource blocks of the narrow bandwidth transmission were estimated in the presence of a transmission to another communications device from the infrastructure equipment in the one or more physical resource blocks, and to exclude the determined soft decision values from the combined soft decision values for the corresponding encoded data symbols.

Paragraph 13. A method of operating an infrastructure equipment forming part of a radio network part of a wireless communications network, the infrastructure equipment being configured to transmit data to a communications device, the method comprising transmitting to the communications device one or more downlink transport blocks transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks, and transmitting an indication to the communications device of the one or more of the plurality of physical resource blocks of the narrow bandwidth downlink transmission of each transport block which overlap with physical resource blocks in which the infrastructure equipment is also transmitting downlink signals to the other communications device, whereby the communication device determines which of one or more soft decision values estimated by the communications device for the purposes of decoding the downlink transport blocks were estimated in the presence of the transmission to the other communications device based on the indication received from the infrastructure equipment.

Paragraph 14. A method according to Claim 13, the transmitting to the communications device the one or more downlink transport blocks comprises transmitting the one or more downlink transport blocks for each of one or more automatic repeat request, ARQ, type transmissions to the communications device.

Paragraph 15. A method according to Claim 14, comprising receiving a feedback message from the communications device comprising an acknowledgment or a negative acknowledgement.

Paragraph 16. An infrastructure equipment forming part of a radio network part of a wireless communications network configured to transmit data to a communications device, wherein the infrastructure equipment comprises transceiver circuitry and controller circuitry which are configured in combination to transmit to the communications device one or more downlink transport blocks transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks, and to transmit an indication to the communications device of the one or more of the plurality of physical resource blocks of the narrow bandwidth downlink transmission of each transport block which overlap with physical resource blocks in which the infrastructure equipment is also transmitting downlink signals to the other communications device, whereby the communications device determines which of one or more soft decision values estimated by the communications device for the purposes of decoding the downlink transport blocks were estimated in the presence of the transmission to the other communications device based on the indication received from the infrastructure equipment.

Paragraph 17. Circuitry for an infrastructure equipment forming part of a radio network part of a wireless communications network configured to transmit data to a communications device, wherein the infrastructure equipment comprises transceiver circuitry and controller circuitry which are configured in combination to transmit to the communications device one or more downlink transport blocks transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks, and to transmit an indication to the communications device of the one or more of the plurality of physical resource blocks of the narrow bandwidth downlink transmission of each transport block which overlap with physical resource blocks in which the infrastructure equipment is also transmitting downlink signals to the other communications device, whereby the communications device determines which of one or more soft decision values estimated by the communications device for the purposes of decoding the downlink transport blocks were estimated in the presence of the transmission to the other communications device based on the indication received from the infrastructure equipment.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] Holma H. and Toskala A, "LTE for UMTS OFDMA and SC-FDMA based radio access", John Wiley and Sons, 2009.
[6] R1-1720541, "On the interest of more flexible resource allocation for efeMTC," Orange, 3GPP RAN1 #91, Reno, USA, Nov. 27-Dec. 1, 2017.

What is claimed is:

1. A method of receiving data at a communications device from an infrastructure equipment forming part of a radio network part of a wireless communications network, the method comprising:

receiving at the communications device one or more downlink transport blocks transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks; and estimating the data carried by each of the one or more downlink transport blocks by performing an error correction decoding in accordance with the error correction encoding applied by the infrastructure equipment, wherein each of the one or more downlink transport blocks is transmitted repeatedly a plurality of times in a corresponding plurality of the time divided units of the wireless access interface, and the estimating the data carried by each of the downlink transport blocks comprises generating, for each repeated transmission of the downlink transport block, for each of a plurality of encoded data symbols of the transport block, a soft decision value for decoding the downlink transport block in accordance with an error correction encoding applied by the infrastructure equipment to the transport block, storing the soft decision values for each repeated transmission of the downlink transport block in a soft buffer for decoding, combining the soft decision values of each of the encoded data symbols from each of the repeated transmissions of the downlink transport block from the soft buffer to form for each of the encoded data symbols a combined soft decision value, and estimating the data carried by each of the downlink transport blocks from the combined soft decision values by performing the error correction decoding in accordance with the error correction encoding applied by the infrastructure equipment, the combining the soft decision values includes determining that the soft decision values for one or more of the repeated transmissions of the downlink transport blocks for one or more of the plurality of physical resource blocks of the narrow bandwidth transmission were estimated in the presence of a transmission to another communications device from the infrastructure equipment in the one or more physical resource blocks, and excluding the determined soft decision values from the combined soft decision values for the corresponding encoded data symbols, the method further comprises receiving an indication from the infrastructure equipment of the one or more of the plurality of physical resource blocks of the narrow bandwidth downlink transmission of each transport block which overlap with physical resource blocks in which the infrastructure equipment is also transmitting downlink signals to the other communications device, the soft decision values estimated in the presence of the transmission to the other communications device being determined from the indication received from the infrastructure equipment, the soft buffer comprises a plurality of soft buffer portions in each of which a plurality of the soft decision values are stored, and the communications device is configured to discard all of the soft decision values in each of the buffer portions which comprise one or more of the soft decision values for each transport block comprising the one or more physical resource blocks which overlap with physical resource blocks in which the infrastructure equipment is also transmitting downlink signals to the other communications device.

2. The method according to claim 1, wherein the indication is received from the infrastructure equipment via downlink control information, DCI, carried by a physical downlink control channel.

3. The method according to claim 1, wherein
the communications device is configured to discard from each of the buffer portions any of the soft decision values for each transport block comprising the one or more physical resource blocks which overlap with physical resource blocks in which the infrastructure equipment is also transmitting downlink signals to the other communications device.

4. The method according to claim 1, wherein
the communications device is configured, when estimating the data carried by each of the one or more downlink transport blocks by performing an error correction decoding in accordance with the error correction encoding applied by the infrastructure equipment, to exclude each of the one or more of the plurality of physical resource blocks of the narrow bandwidth downlink transmission of each transport block which overlap with physical resource blocks in which the infrastructure equipment is also transmitting downlink signals to the other communications device.

5. The method according to claim 1, wherein the determining the soft decision values estimated in the presence of the transmission to the other communications device comprises:

assuming that one or more of the repeated transmissions of the downlink transport block has been received in the presence of the transmission to the other communications device;

re-estimating the data carried by the downlink transport block by performing the error correction decoding on the combined soft decision values excluding those soft decision values generated from the assumed one or more repeated transmissions of the downlink transport block received in the presence of the transmission to the other communications device; and determining that the estimation of the data carried by each of the downlink transport blocks from the combined soft decision values has been estimated correctly, and if not, assuming that a different one or more of the repeated transmissions of the downlink transport block has been received in the presence of the transmission to the other communications device and repeating the re-estimating.

6. The method according to claim 1, wherein the receiving at the communications device the one or more downlink transport blocks comprises:

receiving the one or more downlink transport blocks for each of one or more automatic repeat request, ARQ, type transmissions from the infrastructure equipment.

7. The method according to claim 6, further comprising:
determining, using the estimate of the data carried by the downlink transport block, whether to transmit a feedback message to the infrastructure equipment comprising an acknowledgment or a negative acknowledgement, or no feedback message in accordance with the ARQ-type protocol; and if determined to transmit the feedback message, transmitting the determined feedback message, to the infrastructure equipment from the communications device.

8. The method according to claim 6, further comprising:
receiving, via radio resource control, RRC, signalling from the wireless communications network, an indication of a number of soft buffer portions which may form the soft buffer; and determining, based on the indicated number of soft buffer portions, a number of the soft buffer portions which the communications device is able to assign for each of the one or more ARQ type transmissions.

9. A communications device configured to receive data from an infrastructure equipment forming part of a radio network part of a wireless communications network, the communications device comprising:

transceiver circuitry and controller circuitry configured in combination to:
receive one or more downlink transport blocks transmitted in one or more time divided units of a wireless access interface, the wireless access interface comprising in a frequency dimension resource elements, each of the resource elements for carrying a subcarrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks; and estimate the data carried by each of the one or more downlink transport blocks by performing an error correction decoding in accordance with the error correction encoding applied by the infrastructure equipment, wherein each of the one or more downlink transport blocks is transmitted repeatedly a plurality of times in a corresponding plurality of the time divided units of the wireless access interface, and to estimate the data carried by each of the downlink transport blocks, the transceiver circuitry and the controller circuitry are configured to generate, for each repeated transmission of the downlink transport block, for each of a plurality of encoded data symbols of the transport block, a soft decision value for decoding the downlink transport block in accordance with an error correction encoding applied by the infrastructure equipment to the transport block, store the soft decision values for each repeated transmission of the downlink transport block in a soft buffer for decoding, combine the soft decision values of each of the encoded data symbols from each of the repeated transmissions of the downlink transport block from the soft buffer to form for each of the encoded data symbols a combined soft decision value, and estimate the data carried by each of the downlink transport blocks from the combined soft decision values by performing the error correction decoding in accordance with the error correction encoding applied by the infrastructure equipment, to combine the soft decision values, the controller circuitry and the transceiver circuitry are configured to determine that the soft decision values for one or more of the repeated transmissions of the downlink transport blocks for one or more of the plurality of physical resource blocks of the narrow bandwidth transmission were estimated in the presence of a transmission to another communications device from the infrastructure equipment in the one or more physical resource blocks, and exclude the determined soft decision values from the combined soft decision values for the corresponding encoded data symbols, the controller circuitry and the transceiver circuitry are configured to receive an indication from the infrastructure equipment of the one or more of the plurality of physical resource blocks of the narrow bandwidth downlink transmission of each transport block which overlap with physical resource blocks in which the infrastructure equipment is also transmitting downlink signals to the other communications device, the soft decision values estimated in the presence of the transmission to the other communications device being determined from the indication received from the infrastructure equipment, the soft buffer comprises a plurality of soft buffer portions in each of which a plurality of the soft decision values are stored, and the controller circuitry and the transceiver circuitry are configured to discard all of the soft decision values in each of the buffer portions which comprise one or more of the soft decision values for each transport block comprising the one or more physical resource blocks which overlap with physical resource blocks in which the infrastructure equipment is also transmitting downlink signals to the other communications device.

10. An infrastructure equipment forming part of a radio network part of a wireless communications network configured to transmit data to a communications device, the infrastructure equipment comprising:

transceiver circuitry and controller circuitry configured in combination to:

transmit to the communications device one or more downlink transport blocks transmitted in one or more time divided units of a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into a plurality of physical resource blocks, and each of the one or more downlink transport blocks being transmitted within a narrow bandwidth comprising a plurality of the physical resource blocks; and transmit an indication to the communications device of the one or more of the plurality of physical resource blocks of the narrow bandwidth downlink transmission of each transport block which overlap with physical resource blocks in which the infrastructure equipment is also transmitting downlink signals to the other communications device, wherein the communications device determines which of one or more soft decision values estimated by the communications device for the purposes of decoding the downlink transport blocks were estimated in the presence of the transmission to the other communications device based on the indication received from the infrastructure equipment, the communications device receives an indication from the infrastructure equipment of the one or more of the plurality of physical resource blocks of the narrow bandwidth downlink transmission of each transport block which overlap with physical resource blocks in which the infrastructure equipment is also transmitting downlink signals to the other communications device, the soft decision values estimated in the presence of the transmission to the other communications device being determined from the indication received from the infrastructure equipment, the soft buffer comprises a plurality of soft buffer portions in each of which a plurality of the soft decision values are stored, and the communications device discards all of the soft decision values in each of the buffer portions which comprise one or more of the soft decision values for each transport block comprising the one or more physical resource blocks which overlap with physical resource blocks in which the infrastructure equipment is also transmitting downlink signals to the other communications device.

* * * * *